United States Patent Office 3,340,594
Patented Sept. 12, 1967

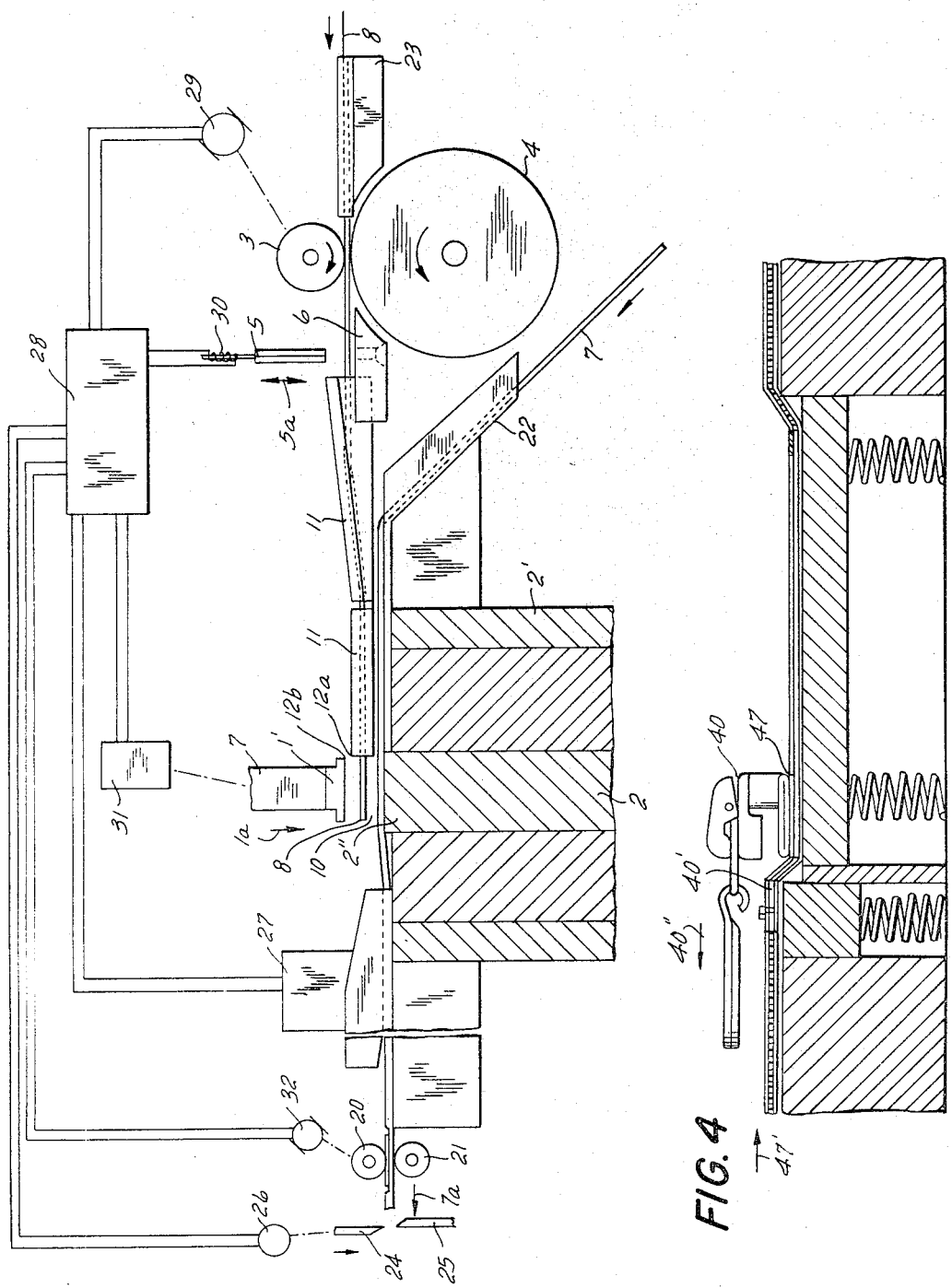

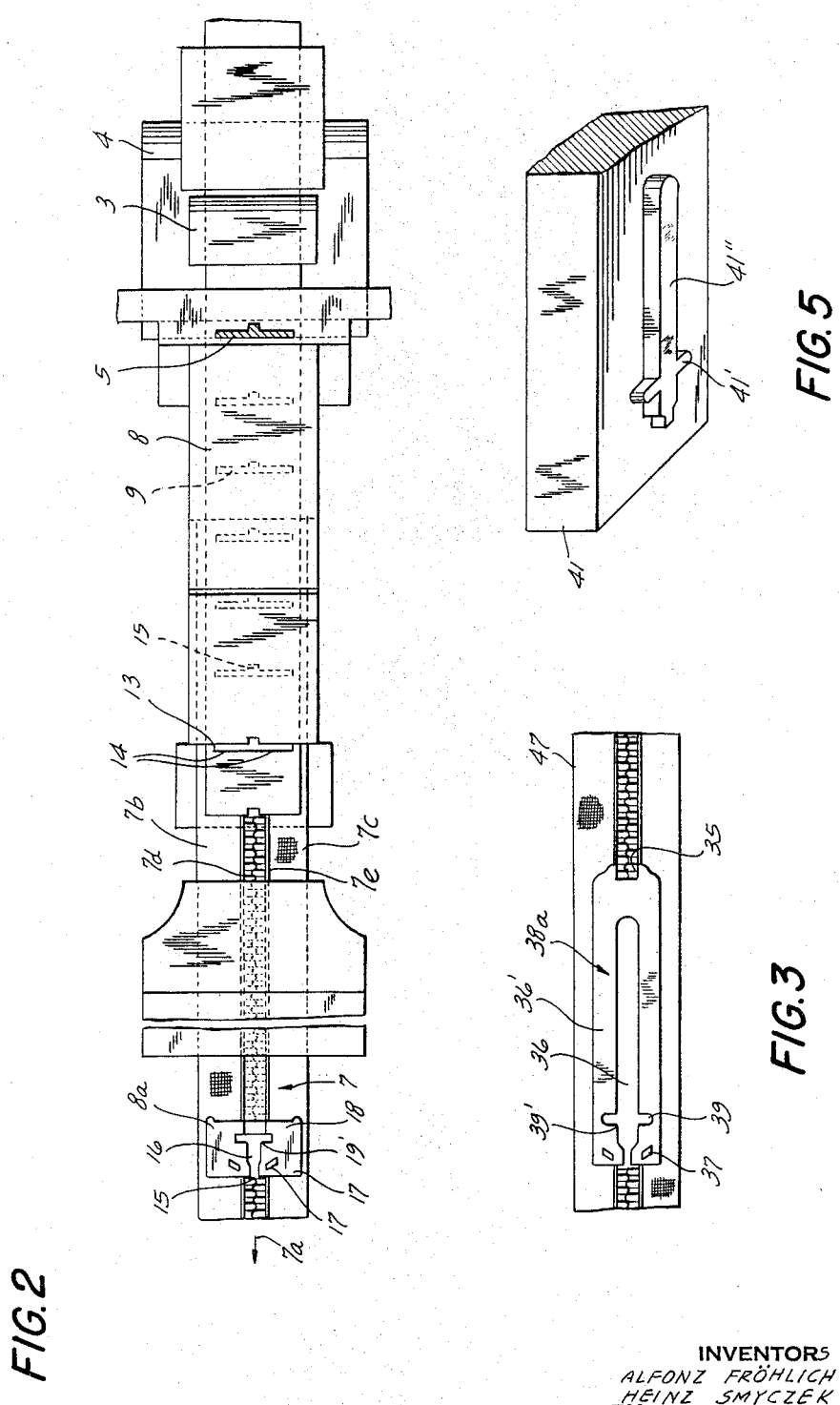

3,340,594
METHOD OF AND APPARATUS FOR THE PRODUCTION OF INDIVIDUAL SLIDE FASTENERS
Alfons Fröhlich and Heinz Smyczek, Essen, Germany, assignors to Opti-Holding A.G., Glarus, Switzerland, a corporation of Switzerland
Filed July 19, 1965, Ser. No. 473,003
Claims priority, application Germany, Apr. 6, 1965,
O 10,769
18 Claims. (Cl. 29—408)

Our present invention relates to the manufacture of slide fasteners of the type comprising a pair of slide-fastener halves interengageable upon the displacement of a slider and each having a support band or tape upon which the respective fastening element is mounted; more particularly, our invention relates to the manufacture and/or completion of individual slide fasteners from a substantially continuous fastener strip whose halves are interconnected upon manufacture.

In the commonly assigned copending application Ser. No. 472,953, filed July 19, 1965, and entitled, Method of and Apparatus for Finishing Slide Fasteners, there is described a method for the completion of individual slide-fastener sections by the mounting thereon of the respective sliders. In that application, there is disclosed the manufacture of slide fasteners, not by joining the slide-fastener halves previously cut to their respective lengths, but by severing a more or less complete slide fastener from a continuous band in which the fastener elements of the respective halves are joined in a more or less continuous manner. The system is applicable to slide fasteners of the so-called helicoidal and meandering types as well as slide fasteners formed from discrete (metallic) coupling elements. It is known, for instance, to provide helical or meandering elements from a linear polyamide and to provide them with spaced-apart formations interengageable with the corresponding formations of the fastening element of the other slide-fastener half. These fastening elements can be produced substantially continuously for lengths of many times that of the finished slide fastener and often several hundreds of times the individual lengths. Thus, the production of individual slide-fastener half-strips is less economical as the industry has resorted to rolls or continuous strips of the slide fastener in which two half-strips are continuously coupled into a slide-fastener strip from which individual lengths are severed, provided with end stops and sliders, and marketed or affixed to the goods with which they are to be used. For the purposes of the present invention, therefore, the expression "slide-fastener strip" will be used to define the continuous band of two matingly interconnected slide-fastener "half-strips," the latter expression defining the continuous length corresponding to the slide-fastener halves. Each half-strip comprises a support band or "tape" by means of which the respective slide-fastener half is attached to the garment or other goods. The term "individual slide fastener" will designate the sections of the slide-fastener strip which are severed therefrom and are of predetermined length, while the "slider" will be understood to be the conventional element shiftable along the individual lengths of the slide-fastener strip or the individual slide fasteners to couple or uncouple their respective fastener elements.

In a conventional method of producing complete individual slide fasteners, the continuous slide fastener strip is subdivided into individual lengths of this strip and the end stops are applied. Especially when the fastener elements are composed of thermoplastic or other synthetic-resin materials, the end stops are constituted by a foil of synthetic resin which is applied transversely to the individual strips and thus commonly extends laterally therebeyond. The process is thus a multistage one in which first the strip is cut into predetermined lengths, secondly the foils are applied transversely to the individual strips, and thirdly the laterally projecting portions of these foils are trimmed to bring their lateral edges into coincidence with the longitudinal edges of the individual strips. Besides the inordinately complex apparatus required for this conventional process and the time-consuming and expensive nature thereof, there are other difficulties arising from the very nature of the technique. For example, it is often desirable to mount the end-stop foil upon the strip in such manner that one part of the foil can form the upper or closed-end stop for one strip while the other part forms the lower or open-end stop for an adjacent strip; this has been discussed in the aforementioned copending application. When this is attempted by conventional methods involving the transverse application of the foil, it is apparent that different spacings between the two end stops to be simultaneously formed from each foil section require that foils of different width be employed. In a plant in which a number of different types and configurations of slide fasteners are produced, this increases the cost and results in a reduction of production efficiency.

It is, therefore, the principal object of the present invention to provide a relatively simple method of and apparatus for the production of individual slide fasteners from a continuous slide-fastener strip.

Another object of this invention is to provide a high-speed method of producing individual slide fasteners in which the above-discussed disadvantages are obviated and which can be carried out significantly more economically than prior art methods.

A further object of our invention is to provide a relatively simple apparatus for the production of slide fasteners wherein the need for a multiplicity of end-stop foils of different width is eliminated and which can be operated automatically and at relatively high rate for the production of individual slide fasteners.

These objects and others which will become apparent hereinafter are attained, in accordance with the present invention, by a method for the production of individual slide fasteners from a previously prepared continuous slide-fastener strip of interconnected slide-fastener halves, the improvement comprising the steps of feeding a continuous foil in the direction of displacement of the slide-fastener strip and in converging relationship therewith so as to arrive at the strip at the end-stop mounting location; at this location, we apply the foil to the slide-fastener strip from above or below and sever a stop-forming section of the foil from the continuous band thereof and apply it (e.g. with heat-bonding or thermal welding) to the fastener strip in a single operation. The foil has a width not greater than the width of the slide-fastener strip and preferably somewhat less than this width so that a lateral trimming of the foil is not necessary.

It will be understood that, in practice, the present invention can be carried out in several different ways. Preferably, prior to separation of the individual foil sections from the continuous foil band and its mounting upon the strip, the foil is provided with transverse slots by punching or stamping, to permit ready separation of the slide-fastener strip after the foil section has been applied. The severing of the slide-fastener strip along these transverse slots has been described in the aforementioned copending application. The transverse slot partially subdivides each foil section into a pair of portions interconnected by relatively narrow webs at opposite ends of these slots. The strip-severing operation is greatly simplified by this arrangement of the foil section.

According to another feature of this invention, the individual foil sections can be provided, by stamping or punching of the foil band, with longitudinal slots intersecting the transverse slots or extending only in one direction therefrom so that two slots are of generally T-shaped configuration or have a configuration of a cross. This longitudinal slot reduces any tendency of the foil section to bond together the initial mating formations of the individual slide fasteners at their open ends. The longitudinal solt according to our invention, is generally so produced that it can serve, prior to severing of the individual slide fasteners from the continuous strip, for the mounting of the respective slider as described in claims in the aforementioned copending application. Thus, the foil can reinforce the longitudinal edges of the slide fastener, which can be provided with a window or aperture registering with the slot into which the slider can be pressed to deflect the strip and bring the reinforced longitudinal edges into alignment with the respective openings of the slider. A relative longitudinal displacement of the slider and the continuous strip in the slide-fastener-opening direction will serve to draw the slider into a section of the slide-fastener strip which can then be separated from the balance of the strip to constitute the original slide fastener.

The heat-sealing step in which the foil is welded to the support bands or tapes and/or the fastener elements (e.g. composed of a thermoplastic material corresponding to that of the foil) can be carried out in different ways, namely, with the simultaneous or subsequent formation of the end elements from the foil or with the formation of the end elements from the thermoplastic material of the fastener elements or chains at their extremities. Thus the instant invention affords the possibility of applying the foil to the slide-fastener strip while retaining the configuration of the elongated fastener elements whereby the end stops are formed exclusively from the foil. In an alternative method, the thermoplastic character of the fastener elements are exploited to form the end stops exclusively from the fastener elements, or partly from the foil and partly from the fastener elements.

According to the apparatus aspects of the present invention, a device for the production of individual slide fasteners from a continuous fastener strip of the character described comprises a heat-sealing plunger which is designed to apply the section of foil to the continuous strip, the plunger forming one member of a die which simultaneously shapes the foil and/or the thermoplastic fastener elements; the other die member is disposed in line with the heat-sealing element on the opposite side of the fastener strip. The latter is led past the heat-sealing members in a direction generally perpendicular to the direction of displacement of these members by a transport device. The transport means also serves to feed a foil strip longitudinally in the direction of displacement of the slide-fastener strip and the guide path for the foil preferably terminates at the heat-sealing end-forming members, defining a cutting edge co-operating with the plunger so that the individual portions of foil are severed from a continuous strip concurrently with their applications to the fastener strip. The plunger is provided with a slotting element while the female die member is provided with a recess accommodating same for the production of the longitudinal and/or transverse slots in the foil and slide-fastener strip. This system is advantageous in that it permits the end stops at both extremities of the individual slide fastened to be formed with the desired distances between them and with substantially any desired distance between the end stops of adjacent individual slide fasteners without the need for foils of different widths. Moreover, the length of slide fasteners reinforced with the foil at its extremities, can be determined independently of the available width of the foil. It is thus possible to provide relatively long longitudinal slots which form end stiffeners and through which the respective sliders can be mounted upon the individual slide fasteners in the manner described in the aforementioned copending application.

The above and other objects, features and advantages of the present invention will become more readily apparent from the following description, reference being made to the accompanying drawing in which:

FIG. 1 is a vertical cross-sectional view, partly in diagrammatic form, illustrating an apparatus for carrying out the method of the present invention;

FIG. 2 is a plan view of this apparatus;

FIG. 3 is a plan view of a foil section different from that of FIGS. 1 and 2, applied to a continuous slide-fastener strip;

FIG. 4 is a longitudinal cross-sectional view through the slide-fastener strip of FIG. 3 showing a slider about to be mounted upon the portion of this strip corresponding to its individual slide fastener; and FIG. 5 is a perspective view of the male die member or plunger for producing the assembly of FIG. 3.

In FIGS. 1 and 2, in which the apparatus for producing individual slide fasteners, according to this invention, is illustrated, we show a male die member 1 in the form of a plunger and punch which cooperates with the female die member 2 of the bed 2' of the device. The die portion 1' and/or the upper part 2" of the male and female members of the punch assembly, respectively, can be constituted as heating elements forming heat-sealing electrodes. The heat-sealing electrodes may be of the resistance-heated type connected with a source of electric current, or of the high-frequency or dielectric-heating type as is well known in the art of heat-sealing thermoplastic foils to one another or the lamination of such foils to other sheet materials. Between the male and female members 1, 2 of the die assembly, a continuous slide-fastener strip 7 is displaced in direction of arrow 7a. As can be seen from FIG. 2, this strip can include the usual carrier bands or tapes 7b, 7c each of which is provided with a respective fastener element 7d, 7e. The fastener element and tapes 7b, 7d and 7c, 7e, form slide-fastener half-strips which are coupled together at the fastener elements to form the fastener strip 7. The strip 7 is provided with a guide and transport device including, for example, the transport rollers 20, 21 which serve to advance the strip 7. The latter is drawn from a supply coil or is forwarded by an apparatus continuously producing the slide fastener along a guide ramp 22 onto the table 2' of the assembly. The thermoplastic foil 8 is fed to the region of the heat-sealing dies 1, 2 along a transport path which includes a guide plate 23 and a cutting table 6. The foil 8 is advanced in the direction of displacement of the strip 7 by a drum 4 and a pressure roller 3 which bear against the foil between the plate 23 and the cutting plate 5. A guide 11 directs the foil 8 into the region of the dies 1, 2 and forms at 12a a cutting edge cooperating with edge 12b of the plunger 1 for severing sections 8a from the foil and applying them to the strip 7 directly therebelow. It will be apparent, therefore, that a severing of each section 8a and its application and sealing to the strip 7 are substantially simultaneous.

Between the foil-advancing rollers 3, 4 and the heat-sealing elements 1, 2, the transport means for the foil 8 is provided with a punch 5, displaceable in the direction of arrow 5a transversely to the plane of the band 8, for the pre-stamping and incising of the latter to form transverse cutouts or slots 9 and longitudinal slots 15 at spaced locations along the band 8. At the locations spaced from the heat-sealing dies 1, 2, the apparatus may be provided with a pair of blades 24, 25, relatively displaceable by, for example, a motor or other electromagnetic means 26 for severing individual lengths of slide fastener from the continuous strip. Along the transport path and rearwardly of the severing device, we prefer to provide a magazine and slide-mounting assembly generally designated 27. This assembly is, of course, of the type described and illustrated in the aforementioned copending application. A control device 28, which can include a cam-operated timer or any other suitable coordinating means, serves to actuate the drive means 29 for the foil-advancing rollers 3 and 4, the power means 30 for the punch 5, the power source 31 for the plunger 1, the slider-mounting station 27, the drive means 32 for rollers 20 and 21 of the transport means, and the power means 26 for the cutting blades 24, 25.

The apparatus of FIGS. 1 and 2 operates substantially as follows:

The slide-fastener strip 7 is fed over the ramp 22 of the first guide means by the transport rollers 20 and 21 onto the table 2′ at the heat-sealing device. The foil section 8a, which is here shown to be disposed above the strip 7 but can also be positioned there below, is advanced along the second guide means 11 etc. synchronously by the rollers 3 and 4 until a section 8a of the foil projects into the path of plunger 1. The latter then is displaced in the direction of arrow 1a to sever the section 8a from the band and apply directly to the strip 7 simultaneously welding it to the latter. Previously, the sections 8a have been provided with slots 9 and 15, as described, by the punch 5 which is triggered in the cadence of the stroke of plunger 1. The feed of the strip 7 and the band 8 is thus synchronized with the thermal-welding assembly 1, 2 and with the punch 5. The co-operating edges 12a and 12b serve to sever the sections 8a from the continuous band 8 at the preformed transverse slits 1. Heat-bonding of its section 8a to the strip is effected as in conventional heat-sealing systems. The advance of the strip 7 by the control means 28 between successive applications of the sections 8a to the strip 7 corresponds to the desired distance between the positions of the end stops at the beginning and end of the individual slide fasteners. The preformed transverse slots 9 not only permit a ready separation of the sections 8a from the band 8 since only the edge webs need be cut through, but also serve to prevent the foil from shifting beneath the plunger 1, because in the region of these slots the electrode extends beyond the edge of the foil section. The longitudinal slotted portion 15 constitutes a recess at the very ends of the section 8a to prevent the sealing or welding of the initial turns of the fastener elements 7d, 7e. This insures that the slider can be subsequently drawn onto the fastener strip at the open side of the fastener. Band 8 can be narrower than the fastener strip 7, thereby eliminating any possibility that an overlap may occur which would necessitate trimming.

The plunger 1 is provided with a male stamping portion which forms the longitudinal slot 17 and a transverse slot 19 in which section 8a is welded to the slide-fastener strip, these longitudinal and transverse slots extending preferably through the fastener strip 7. As the strip 7 is displaced into the region of the slider-mounting station, a slider can be thrust against the foiled-reinforced portion to deflect the region 18 thereof transversely to the strip and permit the edges 19′ to line up with the passages of the slider. A relative longitudinal displacement of the latter and the strip in the slider-opening direction will permit the slider to slip onto the fastener. This step can be carried out by the technique and apparatus of the aforementioned copending application.

A further advance of the slide-fastener strip 7 brings the foil-reinforced area into the region of the cutting means whose blades 24 and 25 separate the individual slide fasteners through the foil sections 8a along the transverse slots 19 so that the portions 17 remain at the open ends of each individual slide fastener, while a portion 18 constitutes the end stop of the closed end of the next slide fastener.

Formations 17′ may project upwardly from the section 17 as described in the aforementioned copending application and are resiliently deflectable by the slider as it is shifted in the direction of arrow 7a onto the slide-fastener section forwardly of the foil section 8a. The formations 17′, however, are pawls preventing reverse displacement of the slider and withdrawal thereof from the fastener.

It will be understood that the distance between the end stops at one end of the strip and the end stop of the next successive strip can be formed without using foils of different width, the advance of the strip 8 by the transport device 3 and 4 being adjusted to the corresponding distance.

In FIGS. 3 and 4, we show a longer section 38a which is severed from a strip 38 and provided with a cutout 35 by a preperforating operation. Here the longitudinal slot 36 and the transverse slot 39 are of cruciform configuration, the end stops being divided at the transverse slots 39. Formations 37 impede withdrawal of the slider 40 (FIG. 4). From FIG. 4 it can be seen that the slider depresses or deflects the strip 7 and brings the edges 39′ into alignment with the passages 40′ of the slider so that displacement of the slider in direction of arrow 40″ and/or displacement of the strip 47 in the direction of arrow 47′ will bring the slider onto the strip. The plunger 41 shown in FIG. 5 is provided with a male stamping portion 41′ for forming the transverse slot 39 and a stamping portion 41″ for forming the longitudinal slot 36. The formations 37 can be shaped by the female die portion 2. The die 2 is permitted only limited vertical displacement against a high-force compression spring. The longitudinal slot 36 has the function of subdividing the foil section 38a into longtiudinal portions 36′ and 36″ which reinforce the strip 47 at the end thereof after the severing of the slide fasteners from the strip.

The invention described and illustrated is believed to admit of many modifications within the ability of persons skilled in the art, all such modifications being considered within the spirit and scope of the appended claims.

We claim:

1. A method of producing individual slide fasteners from a continuous slide-fastener strip having a pair of continuously coupled fastener half-strips each comprising a support band and a fastening element coupled with the fastening element of the other band, said method comprising the steps of:

advancing said slide-fastener strip substantially continuously past a heat-sealing station;

feeding a continuous strip of heat-sealable foil in the direction of advance of said slide-fastener strip and generally parallel thereto said station whereby successive sections of said foil are juxtaposed with said slide-fastener strip;

severing the successive sections of said foil from the continuous strip thereof transversely to said strip and applying said sections to said slide-fastener strip under pressure while heating said sections to bond them to said slide-fastener strip; and severing successive individual lengths of slide fastener from said slide-fastener strip through the foil sections heat-bonded to said slide-fastener strip between said successive lengths, thereby simultaneously forming from said foil sections end stops for successive individual slide fasteners severed from said slide fastener strip.

2. The method defined in claim 1, wherein said foil strip has a width less than that of said slide-fastener strip further comprising the step of forming at least one slot in each of said foil sections concurrently with the heat-bonding of the sections to said slide-fastener strip.

3. The method defined in claim 2 wherein the slot formed in each of said foil sections extends transversely to said slide-fastener strip and the direction of displacement thereof, asid successive lengths of slide fastener being separated from one another by the severing of the guide-fastener strip through the slots of the respective foil sections.

4. The method defined in claim 2 wherein said slot extends longitudinally substantially intermediate the half-strips and said slide-fastener strip is provided with a longitudinal aperture aligned with said slot and adapted to receive a slider mountable on the individual length of slide fastener severed from said slide-fastener strip, said method further comprising the steps of inserting respective sliders through the successive slots and the apertures registering therewith, and relatively shifting said sliders and said slide-fastener strip longitudinal to dispose a slider upon each of said lengths prior to the severing thereof from said slide-fastener strip.

5. The method defined in claim 1, further comprising the step of punching said foil strip at spaced locations therealong to form transverse slots, said successive sections of said foil being severed from the continuous strips thereof at said transverse slots.

6. The method defined in claim 5 wherein said continuous strip of foil is provided at spaced locations with longitudinally extending slots opening into said transverse slots and located at an edge of the foil sections upon the severing thereof from that foil strip and the heat-bonding of the section to said slide-fastener strip, said longitudinal slots preventing the heat-welding of said fastening elements in the immediate region of the respective foil sections.

7. The method defined in claim 6 wherein said fastening elements are continuous and formed from a thermoplastic.

8. The method defined in claim 1 wherein said foil strip has a width less than that of said slide-fastener strip and said foil sections are disposed substantially centrally upon said slide-fastener strip.

9. The method defined in claim 1 wherein said strips are advanced synchronously along respective paths converging at said station.

10. An apparatus for producing individual slide fasteners from a continuous slide-fastener strip having a pair of continuously coupled fastener half-strips each comprising a support band and a fastening element coupled with the fastening element of the other band, said apparatus comprising:

a heat-sealing station having a pair of relatively displaceable heat-sealing die members; first guide means forming a transport path for said slide-fastener strip between said members, at least one of said members being displaceable in a direction perpendicular to the direction of displacement of said strip; second guide means for feeding a continuous strip of heat-sealable foil in the direction of displacement of said slide-fastener strip and generally parallel thereto between said one of said members and said slide-fastener strip with said sections being generally parallel to and juxtaposed with said slide-fastener strip at said heat-sealing station; transport means for advancing said strips along the respective guide means, said second guide means and said one of said members defining co-operating cutting edges transversely of said strips for severing foil sections from said foil strip upon relative displacement of said edges; and means connected with said one of said members for displacing it in the direction of said slide-fastener strip to sever a foil section from the foil strip and apply it under heat and pressure to said slide-fastener strip, thereby bonding said sections to said slide-fastener strip.

11. An apparatus as defined in claim 10 wherein said die members are provided with punch elements for forming at least one slot in each of said sections upon the application thereto to said slide-fastener strip.

12. An apparatus as defined in claim 11 wherein said slot extends longitudinally and is aligned with an aperture formed between said half-strips, said apparatus further comprising means forwardly of said station in the direction of displacement of said slide-fastener strip for inserting sliders onto the length of slide fastener formed between successive foil sections.

13. An apparatus as defined in claim 11, further comprising cutting means forwardly of said station in the direction of displacement of said slide-fastener strip for cutting individual lengths thereof from the slide-fastener strip through the respective foil sections.

14. An apparatus as defined in claim 13 wherein said slot extends transversely of said slide-fastener strip, said cutting means severing said individual lengths through said slots.

15. An apparatus as defined in claim 10, further comprising punch means rearwardly of said station along the second guide means for prepunching said continuous foil strip to provide slots at spaced locations therealong.

16. An apparatus as defined in claim 15 wherein said slots extend transversely of said continuous foil strip, said punch means and said transport means being synchronized to dispose said slots at said edges for cutting off said sections from said foil strip along said slots.

17. An apparatus as defined in claim 16 wherein said punch means is provided with means forming a longitudinal slot extending from each of the transverse slots.

18. An apparatus as defined in claim 10 wherein said first and second guide means define respective paths for said slide fastener and foil strips converging at said station.

References Cited
UNITED STATES PATENTS

| | | | |
|---|---|---|---|
| 2,186,774 | 1/1940 | Sundback | 156—66 |
| 2,701,222 | 2/1955 | Hetzel et al. | 156—66 |
| 2,885,774 | 5/1959 | Waldes | 29—408 |
| 3,001,905 | 9/1961 | Morin | 29—408 X |

JOHN F. CAMPBELL, *Primary Examiner.*

THOMAS H. EAGER, *Examiner.*